United States Patent
Harada et al.

(10) Patent No.: US 8,135,284 B2
(45) Date of Patent: Mar. 13, 2012

(54) FIBER MISCONNECTION DETECTING METHOD AND DEVICE

(75) Inventors: Tomoyuki Harada, Kawasaki (JP);
Masayuki Tsuda, Kawasaki (JP);
Takuya Okamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 786 days.

(21) Appl. No.: 11/751,083

(22) Filed: May 21, 2007

(65) Prior Publication Data

US 2008/0069559 A1   Mar. 20, 2008

(30) Foreign Application Priority Data

Sep. 14, 2006 (JP) ................... 2006-249479

(51) Int. Cl.
*H04B 10/08* (2006.01)
*H04L 12/28* (2006.01)

(52) U.S. Cl. ............ 398/156; 398/16; 398/17; 370/252; 370/253; 370/254; 370/255; 370/256; 370/257; 370/282

(58) Field of Classification Search .................... 398/16, 398/17, 156; 370/252–257, 282
See application file for complete search history.

(56) References Cited

U.S. PATENT DOCUMENTS

| | | | |
|---|---|---|---|
| 6,553,000 B1 * | 4/2003 | Ganesh et al. ................ | 370/235 |
| 6,594,268 B1 * | 7/2003 | Aukia et al. .................. | 370/400 |
| 6,680,912 B1 * | 1/2004 | Kalman et al. ................ | 370/238 |
| 6,680,948 B1 * | 1/2004 | Majd et al. .................... | 370/401 |
| 7,068,608 B2 * | 6/2006 | Mattson et al. ............... | 370/241 |
| 7,417,950 B2 * | 8/2008 | Hofmeister et al. .......... | 370/230 |
| 2002/0171886 A1 * | 11/2002 | Wu et al. ........................ | 359/110 |
| 2003/0134591 A1 * | 7/2003 | Roberts et al. ............... | 455/3.06 |
| 2004/0076151 A1 * | 4/2004 | Fant et al. ...................... | 370/389 |
| 2004/0114922 A1 * | 6/2004 | Hardee .......................... | 398/17 |
| 2006/0068811 A1 * | 3/2006 | Adya et al. ................. | 455/456.2 |
| 2008/0019688 A1 * | 1/2008 | Sun et al. .......................... | 398/2 |

FOREIGN PATENT DOCUMENTS

| | | |
|---|---|---|
| JP | 62-227240 | 10/1987 |
| JP | 2000-307682 | 11/2000 |

OTHER PUBLICATIONS

Lang, "Link Management Protocol", Oct. 2005, The Internet Society, pp. 8-9, 38-42, 50-56.*
Lang and Papadimitriou "Synchronous Optical Network (SONET)/Synchronous Digital Heirarchy (SDH) Encoding for Link Managmeent Protocol (LMP) Test Messages", Oct. 2005, The INternet Society, pp. 1-12.*

(Continued)

*Primary Examiner* — Nathan Curs
*Assistant Examiner* — Tanya Ngo
(74) *Attorney, Agent, or Firm* — Katten Muchin Rosenman LLP

(57) ABSTRACT

In a method and device which can quickly detect a fiber misconnection without setting an expected value, a node identifier of source node and an identifier of an interface for inputting/outputting a signal are set in a predetermined first field of a header to be transmitted to a destination node, and when both identifiers set in the first field are received from the destination node, both identifiers are set in a predetermined second field of the header to be transmitted and stored with the first field. When the identifiers set in the first and second fields are received and the identifiers of the second field among the identifiers are consistent with the identifiers of the first field stored at the second step (means), a connection is determined to be correct.

14 Claims, 21 Drawing Sheets

OTHER PUBLICATIONS

Notification of Reasons for Refusal dated Aug. 11, 2011, from corresponding Japanese Application No. 2006-249479.
RFC4204: Link Management Protocol (LMP), Oct. 2005.
RFC4207: Synchronous Optical Network(SONET)/ Synchronous Digital Hierarchy (SDH) Encoding for Link Management (LMP) Test Messages, Oct. 2005.

* cited by examiner

FIG.3A

| 4 BYTES | 4 BYTES | 4 BYTES | 4 BYTES | 48 BYTES |
|---|---|---|---|---|
| SOURCE NODE ID | SOURCE INTERFACE ID | DESTINATION NODE ID | DESTINATION INTERFACE ID | Trace String (EXTRA FIELD) |

FIG.3B

| DESTINATION NODE ID | DESTINATION INTERFACE ID | SOURCE NODE ID | SOURCE INTERFACE ID | Trace String (EXTRA FIELD) |
|---|---|---|---|---|

UPPER FIELD — DESTINATION NODE ID, DESTINATION INTERFACE ID
LOWER FIELD — SOURCE NODE ID, SOURCE INTERFACE ID

| | 4 BYTES | 4 BYTES | 4 BYTES | 4 BYTES | 48 BYTES |
|---|---|---|---|---|---|
| FIG.15A | SOURCE NODE ID | SOURCE INTERFACE ID | DESTINATION NODE ID | DESTINATION INTERFACE ID | Trace String |

| | DESTINATION NODE ID | DESTINATION INTERFACE ID | SOURCE NODE ID | SOURCE INTERFACE ID | Trace String |
|---|---|---|---|---|---|
| FIG.15B | | | | | |

UPPER FIELD / LOWER FIELD

| | 48 BYTES |
|---|---|
| FIG.15C | Trace String |

FIBER MISCONNECTION DETECTING METHOD AND DEVICE

BACKGROUND OF THE INVENTION

1. Field of the Invention

The present invention relates to a fiber misconnection detecting method and device, and in particular to a method and device for detecting an error of a fiber connection between SONET (Synchronous Optical NETwork) devices.

2. Description of the Related Art

In a network formed of a plurality of SONET devices (hereinafter, referred to as nodes), as shown in FIG. 19, nodes N are connected with fibers (optical fibers) F. Regarding each node N within the network, the node has a plurality of interface slots and one or more adjoining nodes connected with fibers.

Upon network construction, whether or not the fiber connection between the interfaces of nodes N is correct is confirmed. For this purpose, a user on a source (transmitting) side sets a unique J0 byte to be transmitted per fiber (per interface of node) connecting the nodes, and a user on a destination (receiving) side manually sets an expected value for the J0 byte and confirms if the J0 byte received is consistent with the expected value, thereby verifying the normality of the fiber connection between opposed nodes (interfaces).

This will now be specifically described referring to FIGS. 20 and 21.

Firstly, when nodes N#1 and N#2 are connected with an optical fiber, a Section Trace function by the J0 byte of a section overhead is used for confirming if the connection is correct (not misconnection).

In the example of FIG. 20, the source node N#1 sets "AAA" in the J0 byte to be transmitted from an interface IF#3. In an interface IF#10 of the destination node N#2, a user manually presets an expected value "AAA" received from a correct source. In this occasion, the J0 byte actually received by the interface IF#10 of the destination node N#2 is consistent with the expected value, so that it is determined that the connection between the interfaces IF#3 and IF#10 is correct. As for the reverse direction from the node N#2 to the node N#1, it is determined by using another expected value "BBB" that the connection is correct.

While the receiving (reception) expected value of the interface IF#3 of the node N#1 is "BBB" in the example of FIG. 21, the J0 byte actually received from the node N#2 is a value "YYY" transmitted from the interface IF#2 of the node N#2. Therefore, both values are not consistent with each other, so that it is determined that the fiber connection between the interfaces IF#3 and IF#10 is incorrect. Similarly, it is determined that the connection between the interfaces IF#4 and IF#20 is incorrect.

It is to be noted that there has been a method of automatically collecting connection states between nodes (which nodes are connected with each other) by using Link Connectivity Verification of an LMP (Link Management Protocol) which is one of GMPLS (Generalized Multi-Protocol Label Switching) protocol groups (see e.g. non-patent document 1).

Also, there has been a line corresponding information coincident method of an ADPCM transcoder. In the line corresponding information coincident method which makes line corresponding information indicating a line correspondence of signals in opposed devices coincident by the ADPCM transcoder which performs a mutual code conversion between two primary group signals which can accommodate 24 lines of PCM signal whose transmission speed is 64 kbps and a single primary group signal which can accommodate 48 lines of ADPCM signals whose transmission speed is 32 kbps, a line corresponding table indicating a line correspondence of the signals is prepared in the ADPCM transcoder, an address number of the line corresponding table is inserted into the line transmitting signaling information in the primary group signal which can accommodate 48 lines of the ADPCM signal, and the line corresponding information is made coincident by transmitting/receiving the address number between the opposed devices (see e.g. patent document 1).

[Non-patent document 1] RFC4204:LMP RFC4207:SONET/SDH Encoding for LMP Test Message

[Patent document 1] Japanese Patent Application Laid-open No. 62-227240

In the examples shown in FIGS. 20 and 21, the connection normality can not be confirmed unless a user correctly sets the J0 byte transmission value on the source side and the J0 byte receiving expected value on the destination side for all of the slots or ports (interfaces).

Even if the connection normality is confirmed, it is impossible to collect information as to which interface each node is correctly connected to.

Furthermore, when the J0 byte transmission value or the J0 byte receiving expected value is set in error, it is disadvantageous that the fiber connection is recognized as being incorrect even if the actual fiber connection is correct, or conversely the connection is recognized as being correct even if a misconnection occurs.

Also, in case of the non-patent document 1, numerous messages are transferred by using an IP layer until Verification is completed. Therefore, it is disadvantageous that it takes time until the collection of connection state information of all of the slots or ports is completed. As a matter of course, if either one of the nodes does not support GMPLS, this function can not be achieved.

SUMMARY OF THE INVENTION

It is accordingly an object of the present invention to provide a method and device which can quickly detect a fiber misconnection without setting an expected value.

In order to achieve the above-mentioned object, a fiber misconnection detecting method (or device) comprises: a first step of (or means) setting a node identifier of source node and an identifier of an interface for inputting/outputting a signal in a predetermined first field of a header to be transmitted to a destination node; a second step of (or means) setting, when both identifiers set in the first field are received from the destination node, both identifiers in a predetermined second field of the header to be transmitted and stored with the first field; and a third step of (or means) determining that a connection is correct when the identifiers set in the first and second fields are received and the identifiers of the second field among the identifiers are consistent with the identifiers of the first field stored at the second step (or means).

Namely, in the present invention, as shown in FIG. 1A for example, J0 byte (or a free space of a section overhead other than the J0 byte) is used, and a field for embedding therein node identifiers (IDs) and interface (slot or port) identifiers (IDs) of opposed two nodes is provided in the J0 byte as a predetermined first field of a header. In each of the opposed nodes, a source node ID and a source interface ID are written in the first (upper) field of the J0 byte. Thus, the node ID and the interface ID of each node are to be included in the J0 byte transmitted from each node.

A destination node stores or copies the values provided in the first field within the received J0 byte in the second (lower) field of a transmitting J0 byte. By transmitting the J0 byte including the first and second fields, one node can acquire the node ID and the interface ID of the other node.

By continuing the above-mentioned operation, the destination node holds the node IDs and the interface IDs of the opposed node and its own node. In each node, the first field of the transmitting J0 byte is compared with the second field of the receiving J0 byte. As a result, when both are consistent with each other, it is determined that the fiber connection between the same interfaces is correct.

As a result of the comparison, when an inconsistence occurs, in order to indicate that the fiber is connected to a different interface, an alarm notification is given to a user in such a form that a source interface and a misconnected destination interface are recognizable. By this alarm notification, the user can confirm that the fiber misconnection has occurred.

Also, the fiber misconnection detecting method (or device) may further comprise a fourth step of (or means) setting an expected value in a third field, in addition to the first and second fields, and a fifth step of (or means) determining whether or not the expected value is consistent with a receiving expected value preset when the expected value is received.

Accordingly, when the fifth step (or means) determines inconsistency even if the third step (or means) determines that the connection is correct, it can be determined that the receiving expected value is set in error.

As described above, by the present invention, a misconnection between the interfaces of the opposed nodes can be quickly detected without supporting an expected value or the GMPL. Also, in each node, fiber connection information with the opposed node can be collected.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 3A and 3B are diagrams showing an example of a J0-byte management table in an embodiment [1] of the present invention;

FIGS. 15A-15C are diagrams showing an example of a J0-byte management table in an embodiment [2] of the present invention;

DESCRIPTION OF THE EMBODIMENTS

Embodiment [1]

Figure 1:
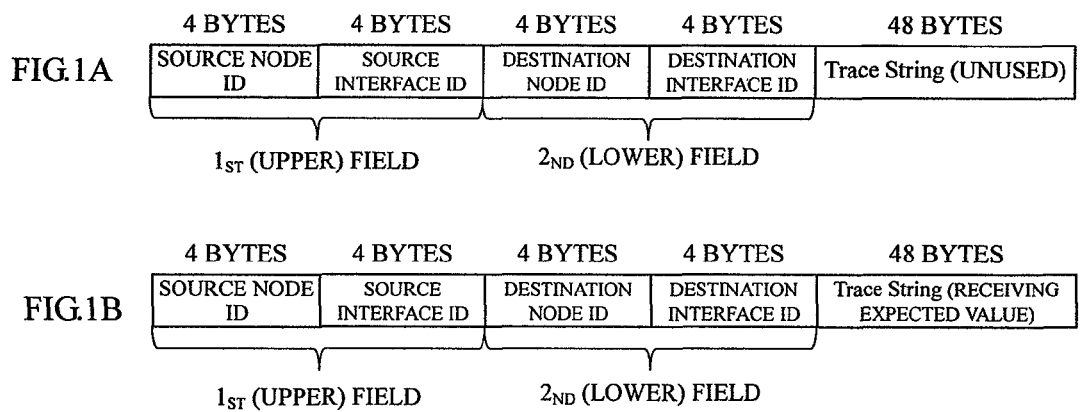
FIGS. 1A and 1B are diagrams showing a mapping example of J0 byte used for a fiber misconnection detecting method and device according to the present invention.
Figure 2:
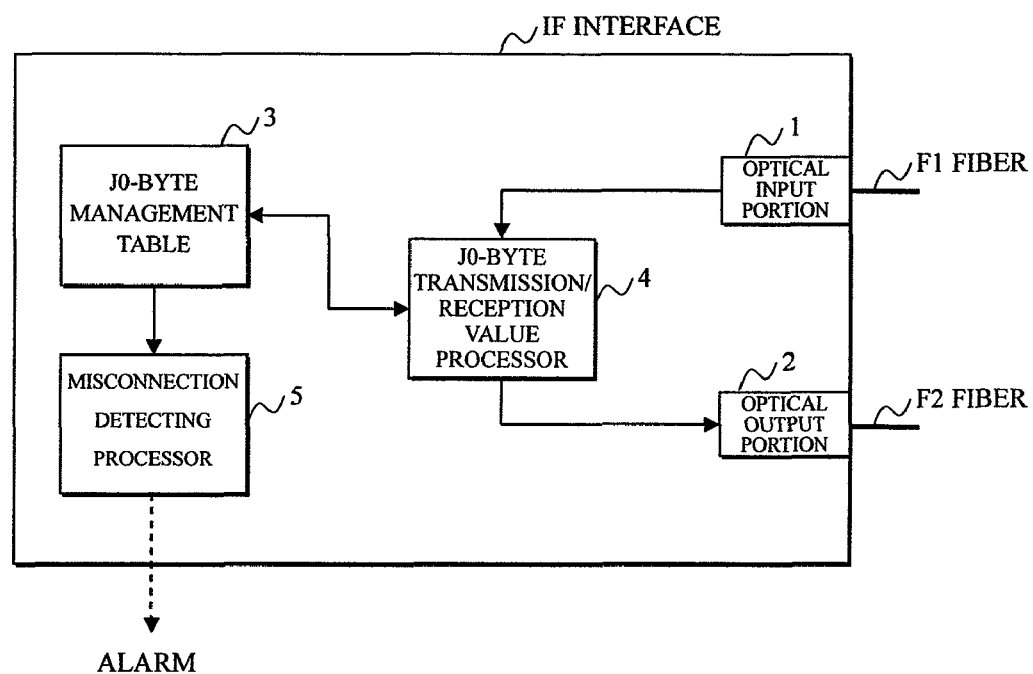
FIG. 2 is a block diagram showing an arrangement of each interface within a node by an embodiment [1] of a fiber misconnection detecting method and device according to the present invention.

FIGS. 2, 3A. 3B, and 4-13

FIG. 2 shows an arrangement of each interface (slot or port) within each node according to an embodiment [1]. Each interface is composed of an optical input portion 1 which inputs an optical signal from a fiber F1, an optical output portion 2 which outputs an optical signal to a fiber F2, a J0-byte management table 3, a J0-byte transmission value processor 4 which prepares a transmission value of J0 byte from a reception value of J0 byte inputted from the optical input portion 1 by using information stored in the J0-byte management table 3 to be transmitted to the optical output portion 2, and a misconnection detecting processor 5 which properly generates an alarm based on the information of the J0-byte management table 3.

Figure 4:
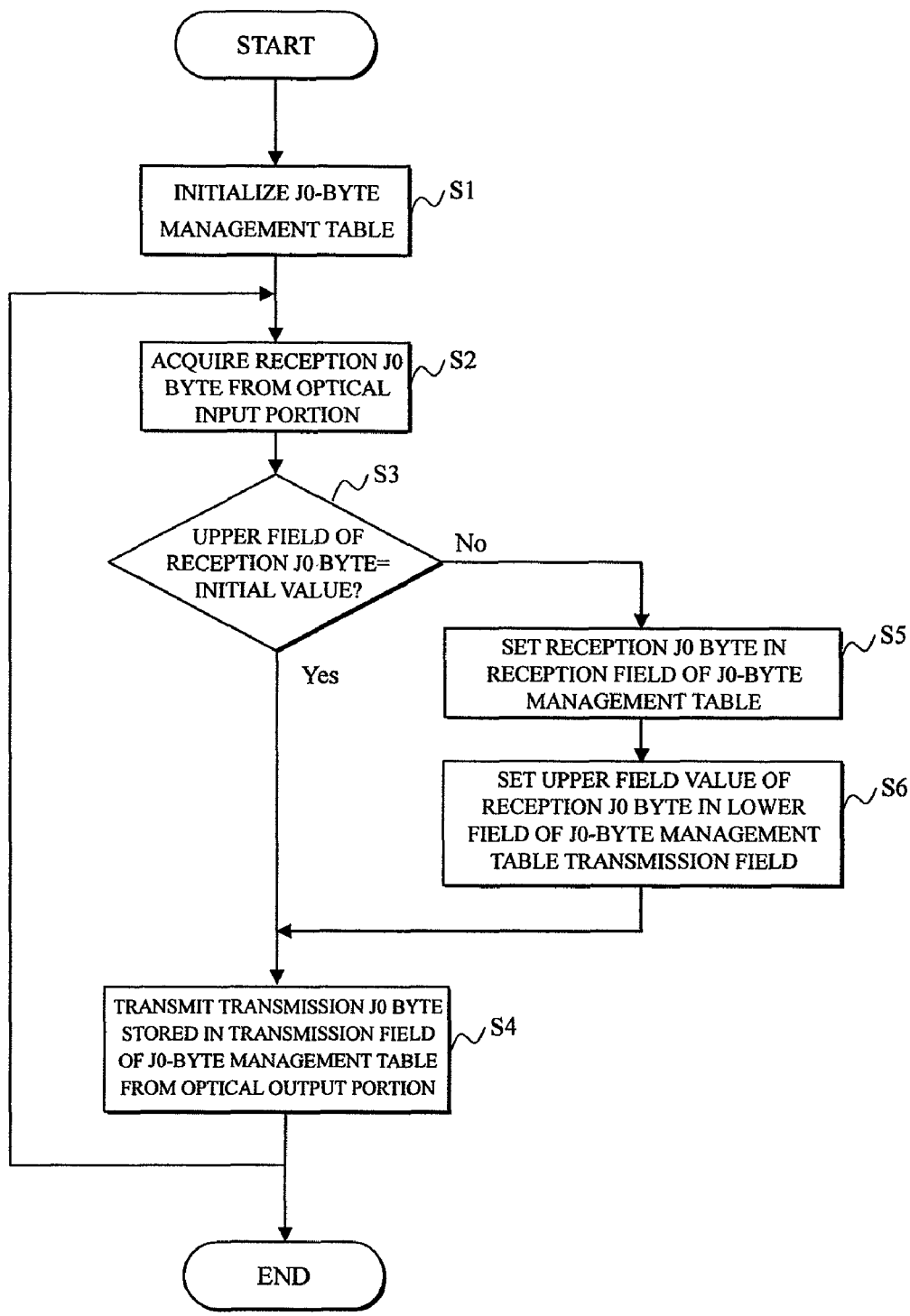
FIG. 4 is a flowchart showing an operation example of a J0-byte transmission/reception value processor used for each interface of a node in the present invention.
Figure 5:
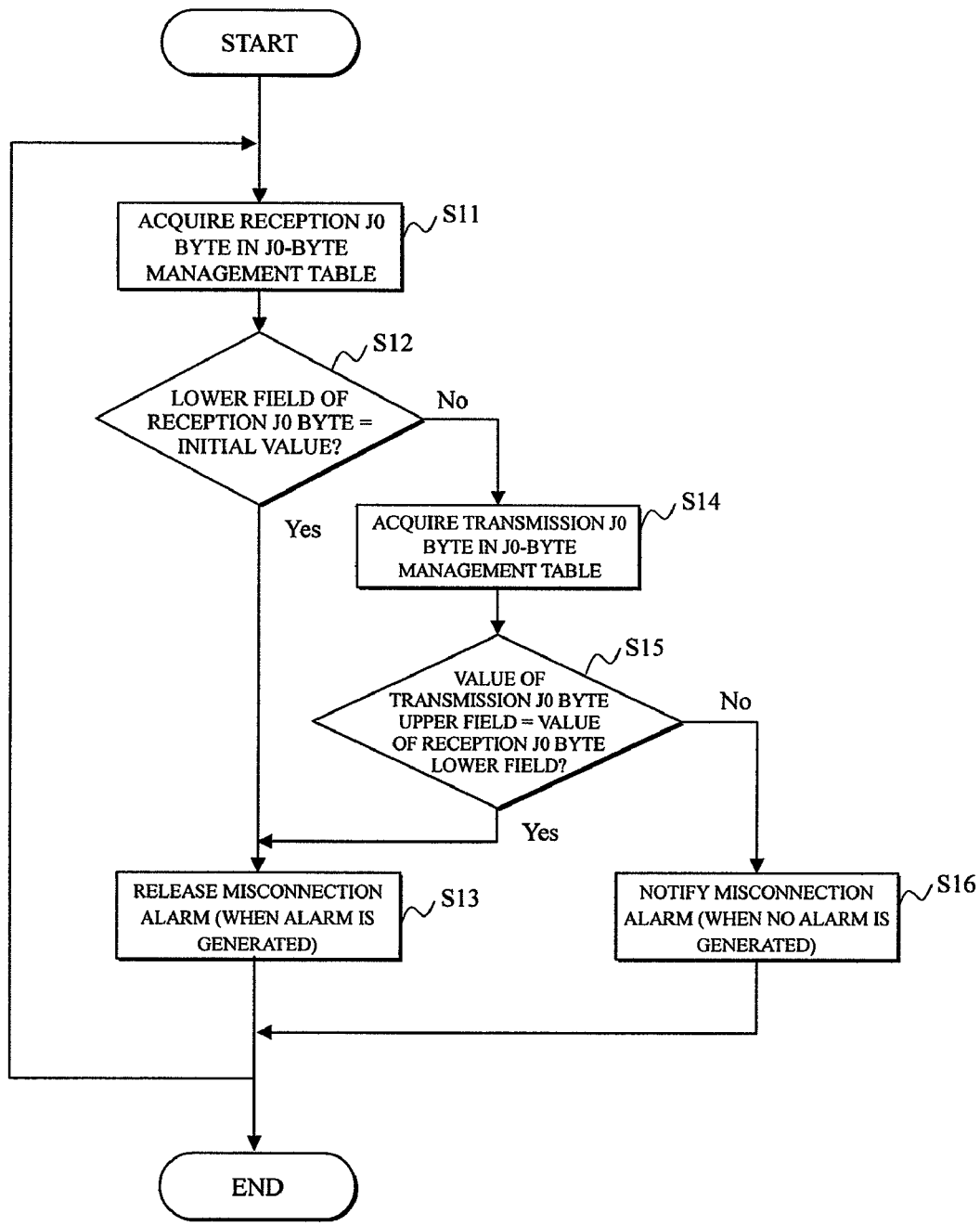
FIG. 5 is a flowchart showing an operation example of a misconnection detecting processor used for each interface of a node in the present invention.

FIGS. 3A and 3B show an embodiment of the above-mentioned J0-byte management table 3. FIG. 4 shows an operation flow of the J0-byte transmission/reception value processor 4. FIG. 5 shows an operation flow of the misconnection detecting processor 5. FIGS. 3A, 3B, 4, and 5 will be sequentially described in the correct (normal) connection operations (1)-(4) and the misconnection operations (1)-(4), both noted below, in the interface shown in FIG. 2.

Correct Connection Operation: FIGS. 6-9

Figure 6:
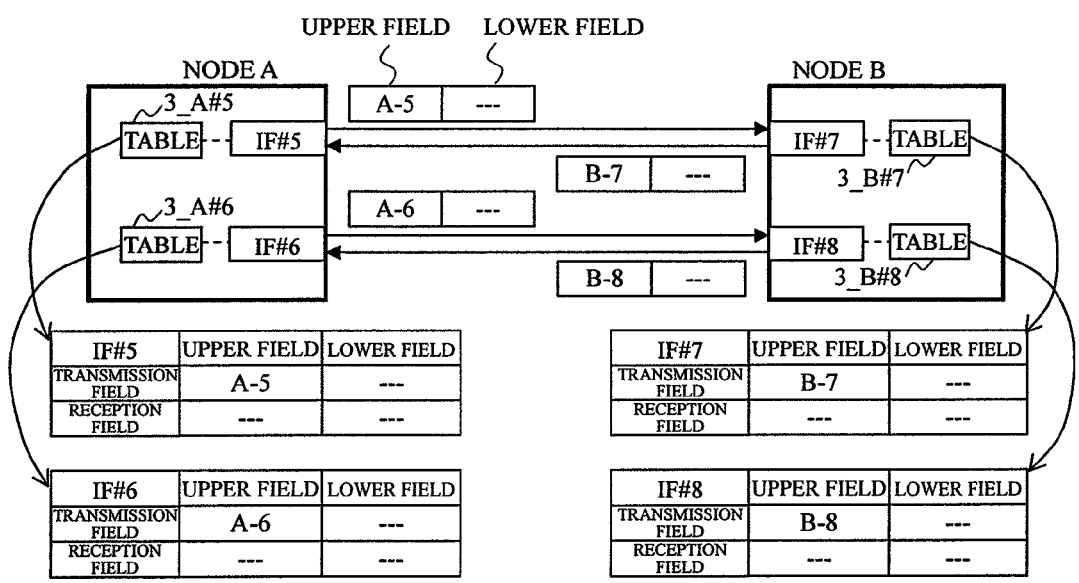
FIG. 6 is a block diagram showing a correct connection operation (1) by an embodiment [1] of the present invention.

Operation (1): FIG. 6

In the opposed nodes A and B, the interfaces IF#5 and IF#6 of the node A respectively have J0-byte management tables 3_A#5 and 3_A#6. The interfaces IF#7 and IF#8 of the node B respectively have J0-byte management tables 3_B#7 and 3_B#8. These J0-byte management tables 3 have a transmission and reception fields (areas) respectively shown in FIGS. 3A and 3B, and are occasionally represented by a reference numeral "3".

As for the J0 byte transmitted from the interface IF#5 of the node A, the node A transmits it to the node B in which the information of an interface IF ID=5 of a source node ID=A (indicated by "A-5" as ID in FIG. 6) is stored as shown in the J0-byte management table 3_A#5 of FIG. 6 in the upper field of the transmission field shown in FIG. 3A. At this time, the J0-byte transmission/reception value processor 4 executes step S4 through steps S1-S3 shown in FIG. 4.

Similarly, the J0 byte in which ID "A-6" is set in the upper field is transmitted from the interface IF#6 of the node A to the node B, and the J0 bytes in which IDs "B-7" and "B-8" are respectively set in the upper fields are transmitted from the interfaces IF#7 and IF#8 of the node B to the node A.

Figure 7:
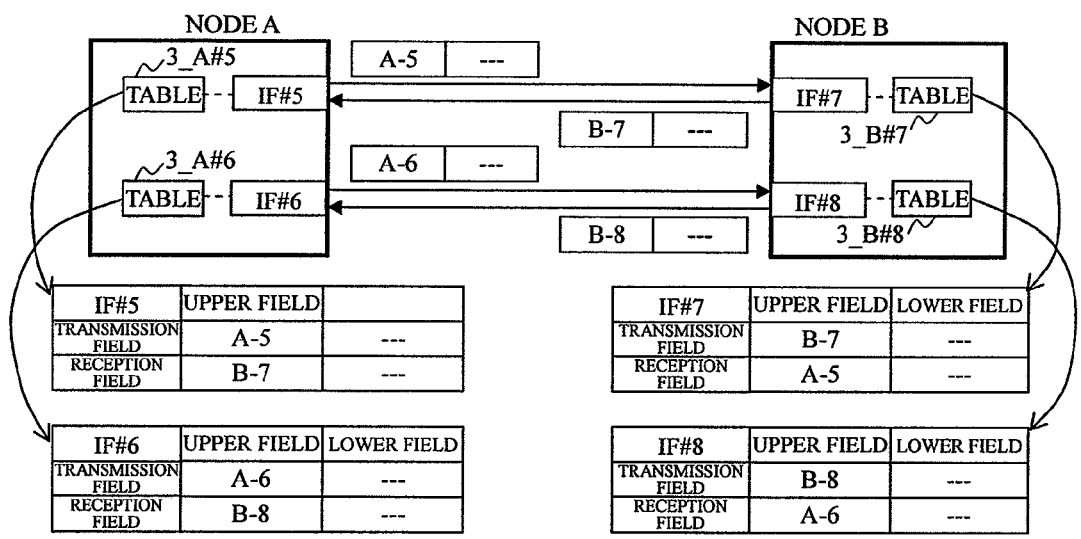
FIG. 7 is a block diagram showing a correct connection operation (2) by an embodiment [1] of the present invention.

Operation (2): FIG. 7

In case of the J0 byte in which e.g. ID "A-5" is set in the upper field, the node B having received the J0 byte from the node A stores the ID "A-5" in the upper field of the reception field (see FIG. 3B) as shown in the J0-byte management table 3_B#7 of the interface IF#7 in FIG. 7 (at step S5).

Similarly, the ID "A-6" is set in the upper field of the reception field of the table 3_B#8 in the interface IF#8 of the node B having received from the node A the J0 byte in which the ID "A-6" is set in the upper field. Similarly, the IDs "B-7" and "B-8" are respectively stored in the upper fields of the reception fields based on the J0 bytes respectively received by the interfaces IF#5 and IF#6, as shown in FIG. 7, as well as the J0-byte management tables 3_A#5 and 3_A#6 of the node A.

Figure 8:
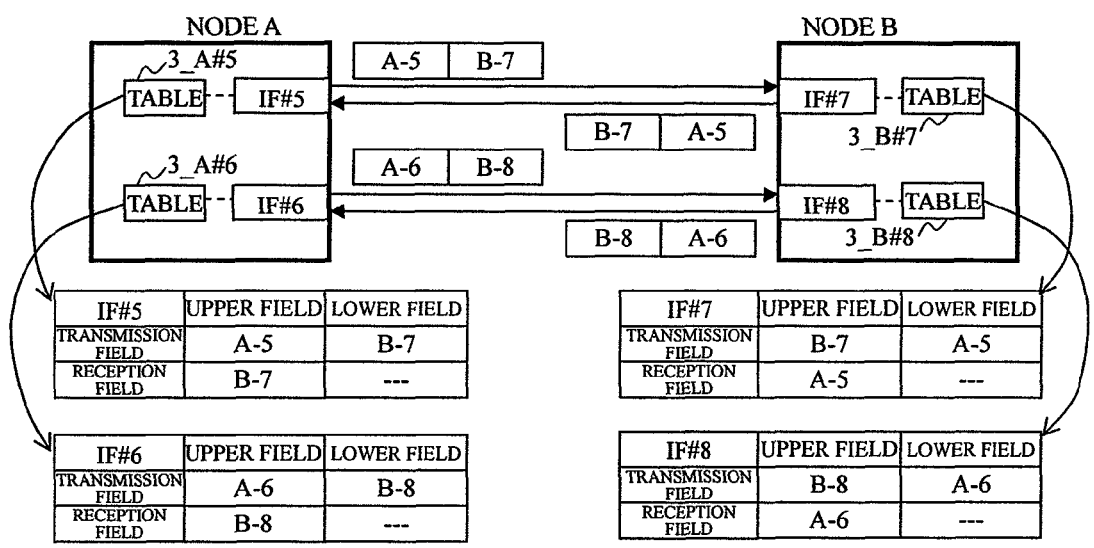
FIG. 8 is a block diagram showing a correct connection operation (3) by an embodiment [1] of the present invention.

Operation (3): FIG. 8

In the node B, the ID "A-5" stored in the upper field of the reception field of the J0-byte management table 3_B#7 is copied and stored in the lower field of the transmission field (at step S6).

Similarly, in the table 3_B#8 of the node B, the ID "A-6" stored in the upper field of the reception field is copied and stored in the lower field of the transmission field. Furthermore, similarly in the tables 3_A#5 and 3_A#6 of the node A, the IDs "B-7" and "B-8" stored in the upper fields in the reception fields are copied and stored in the lower fields of the transmission fields.

Thus, in the tables 3_A#5 and 3_A#6 of the node A as well as the tables 3_B#7 and 3_B#8 of the node B, the upper and lower fields respectively hold source node ID (node ID+interface ID) and the opposed node ID (node ID+interface ID) in the transmission fields.

In such a state, the J0-byte transmission/reception value processor 4 transmits the IDs of the upper and lower fields set in the transmission fields of each J0-byte management table 3 to the fiber F2 through the optical output portion 2 (at step S4).

Figure 9:
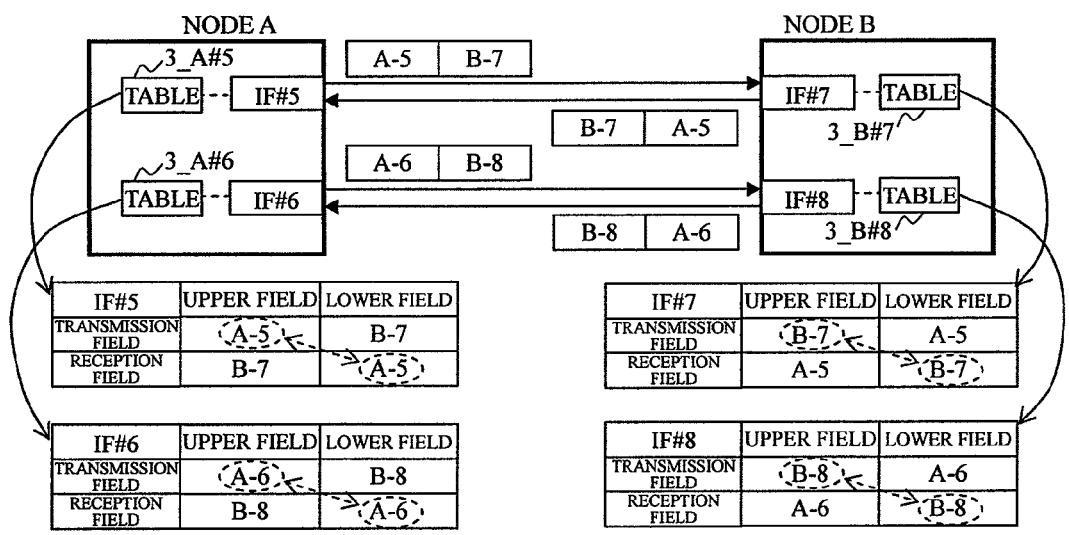
FIG. 9 is a block diagram showing a correct connection operation (4) by an embodiment [1] of the present invention.

Operation (4): FIG. 9

At step S4 in the above-mentioned operation (3), the interface IF#7 of the node B receives from the interface IF#5 of the node A the J0 byte in which the ID "A-5" is set in the upper field and the ID "B-7" is set in the lower field. Therefore, the J0-byte transmission/reception value processor 4, in the same way as the above-mentioned operation (2), overwrites the ID "A-5" in the upper field and stores the ID "B-7" in the lower field of the reception field in the table 3_B#7, as shown in FIG. 9.

Similarly, the ID "A-6" of the upper field and the ID "B-8" of the lower field in the J0 byte transmitted from the interface IF#6 of the node A are respectively stored in the upper and lower fields in the reception field of the J0-byte management table 3_B#8 of the node B.

Similarly in the J0-byte management table 3_A#5 of the node A, the ID "B-7" of the upper field and the ID "A-5" of the lower field in the J0 byte transmitted from the interface IF#7 of the node B are respectively stored in the upper and lower fields in the reception field as shown in FIG. 9. Similarly in the J0-byte management table 3_A#6 of the node A, the ID "B-8" of the upper field and the ID "A-6" of the lower field in the J0 byte transmitted from the interface IF#8 of the node B are respectively stored in the upper and lower fields in the reception field.

When the IDs are thus stored in the transmission field and the reception field in the tables, the misconnection detecting processor 5 acquires the reception J0 byte values in the J0-byte management table 3 (at step S11), confirms that the values are not lower field initial values of the reception J0 byte (at step S12), and then acquires the ID of the transmission field in the J0-byte management table (at step S14). Hereafter, as shown by doted lines, whether or not the value of the upper field in the transmission field is consistent with the value of the lower field in the reception field is determined in each table (at step S15).

As a result of this determination, both values are consistent with each other in the example of FIG. 9. Therefore, no alarm is generated (at step S13). It is to be noted that in case where an alarm has been generated, the alarm is released.

Thus, the upper field of the transmission field is consistent with the lower field of the reception field in the table 3, so that it is determined that no misconnection occurs.

Also, as for a connection relationship, it can be confirmed in both of the nodes A and B by the J0-byte management table 3 that the interface IF#5 of the node A and the interface IF#7 of the node B as well as the interface IF#6 of the node A and the interface IF#8 of the node B are correctly connected respectively.

Misconnection Operation: FIGS. 10-13

The misconnection in this example is caused by a reverse connection of the fibers of the interfaces IF#5 and IF#6 in the node A.

Figure 10:
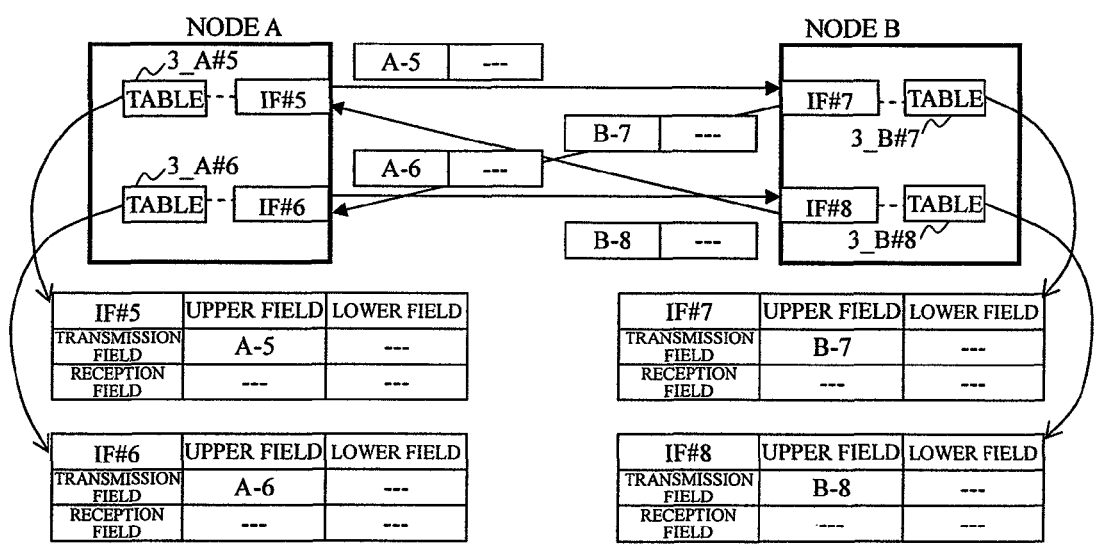
FIG. 10 is a block diagram showing a misconnection operation (1) by an embodiment [1] of the present invention.

Operation (1): FIG. 10

This operation (1) is the same as the operation (1) upon correct connection shown in FIG. 6.

Figure 11:
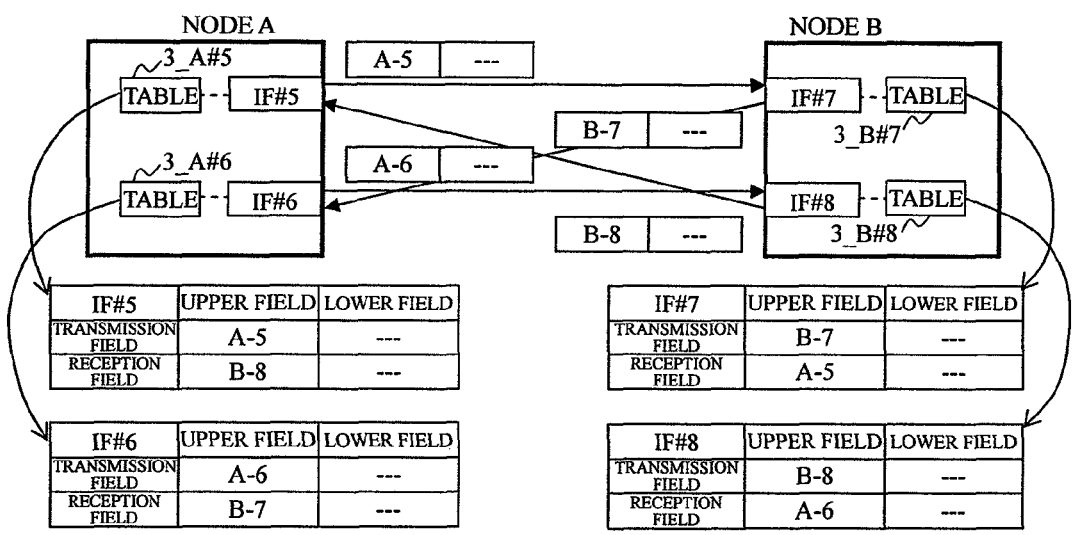
FIG. 11 is a block diagram showing a misconnection operation (2) by an embodiment [1] of the present invention.

Operation (2): FIG. 11

As mentioned above, the fibers of the interfaces IF#5 and IF#6 in the node A are reversely connected. Therefore, the J0 byte from the interface IF#7 of the node B is provided to the interface IF#6 of the node A in the operation (2). Accordingly, the ID "B-7" is stored in the upper field of the reception field in the J0-byte management table 3_A#6 of the node A as shown in FIG. 11. Similarly, the interface IF#5 of the node A inputs the J0 byte from the interface IF#8 of the node B, so that the ID "B-8" is stored in the upper field of the reception field, as shown, in the J0-byte management table 3_A#5 of the node A. It is to be noted that in the tables 3_B#7 and 3_B#8, the same IDs as those upon the above correct connection are respectively stored in the upper fields in the reception fields.

Figure 12:
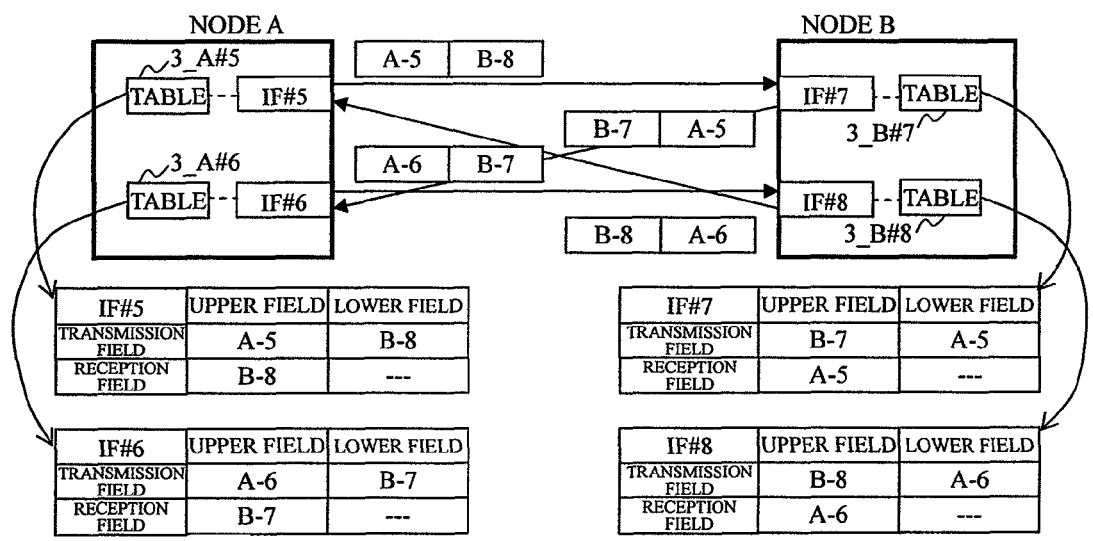
FIG. 12 is a block diagram showing a misconnection operation (3) by an embodiment [1] of the present invention.

Operation (3): FIG. 12

In the operation (3), the ID stored in the upper field of the reception field in each J0-byte management table 3 is copied and stored in the lower field of the transmission field in the same way as the operation (3) upon correct connection shown in FIG. 8.

The J0 byte in which the ID of the transmission field in each table 3 is set is transmitted to the opposed node.

Figure 13:
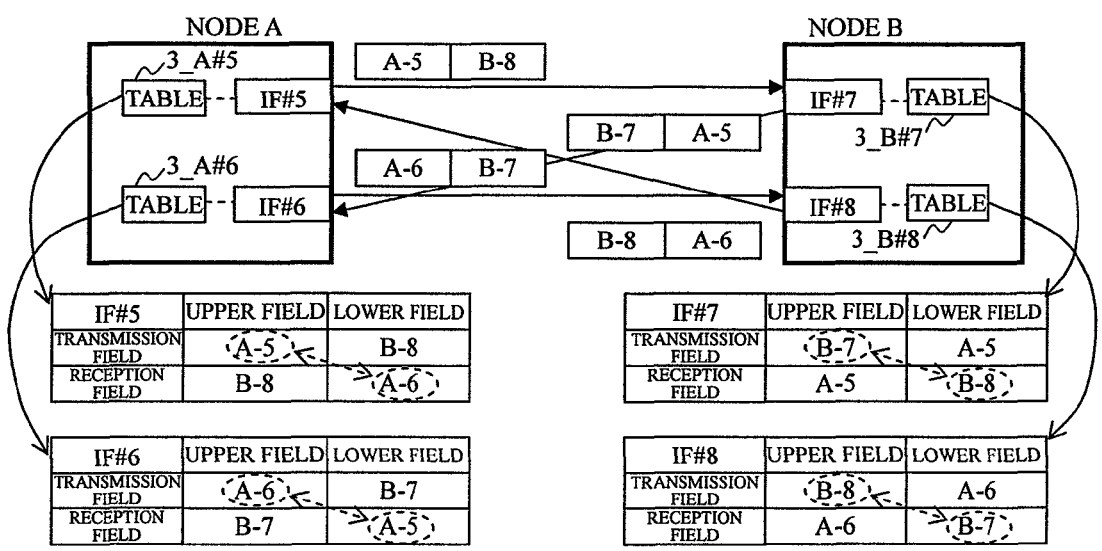
FIG. 13 is a block diagram showing a misconnection operation (4) by an embodiment [1] of the present invention.

Operation (4): FIG. 13

When the J0 byte is transmitted by the operation (3) shown in FIG. 12, the IDs in the upper and lower fields set in the J0 byte transmitted from the opposed node are stored in the upper and lower fields of the reception field respectively in each table 3 as shown in FIG. 13.

As a result, the ID "B-8" of the upper field and the ID "A-6" of the lower field in the J0 byte transmitted from the interface IF#8 of the node B are respectively stored in the upper and lower fields of the reception field in the J0-byte management table 3_A#5 of the node A. Similarly, the ID "B-7" of the upper field and the ID "A-5" of the lower field set in the J0 byte transmitted from the interface IF#7 of the node B are respectively set in the reception field of the J0-byte management table 3_A#6 of the node A.

If the IDs are set in this way, the misconnection detecting processor 5 compares the ID of the upper field in the transmission field with the ID of the lower field in the reception field at step S15 through steps S11, S12, and S14, so that a misconnection alarm notification is performed since the IDs are inconsistent with each other in all of the tables 3 as shown by the doted lines in FIG. 13 (at step S16).

Since the upper field of the transmission field and the lower field of the reception field are different from each other, the occurrence of the misconnection is detected, so that it becomes possible to perform an alarm notification to a user in such a form that a source port and a misconnected destination port are recognizable.

Embodiment [2]

FIGS. 14, 15A-15C, and 16-18

Figure 14:
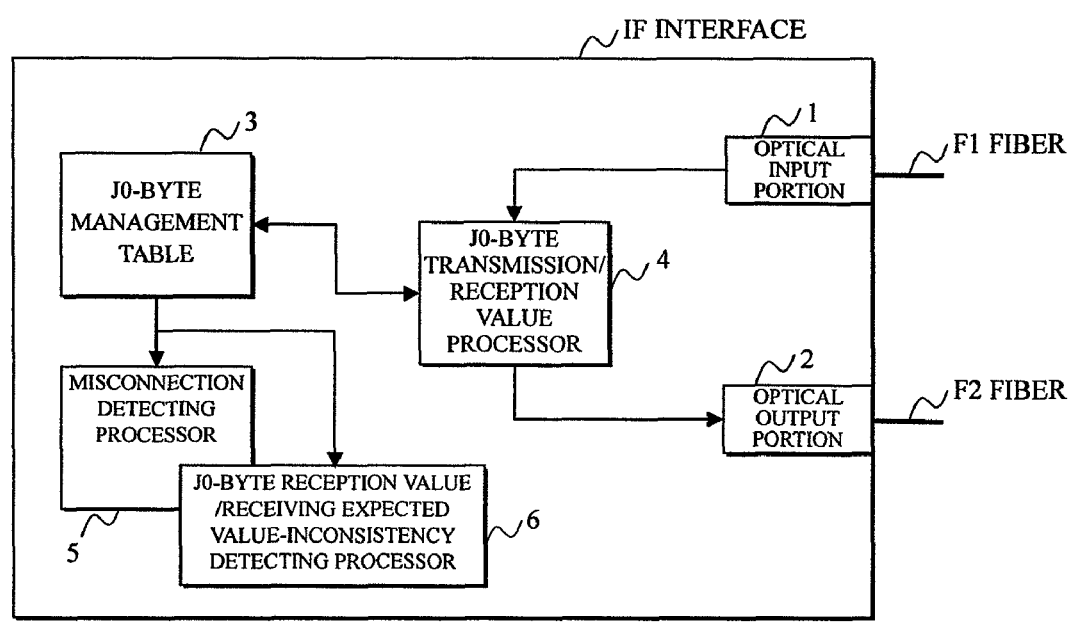
FIG. 14 is a block diagram showing an arrangement of each interface within each node by an embodiment [2] of a fiber misconnection detecting method and device according to the present invention.

FIG. 14 shows an arrangement of each interface within each node by the embodiment [2] of the present invention. This arrangement is different from the operation example of each interface by the embodiment [1] shown in FIG. 2 in that a J0-byte reception value/receiving expected value-inconsistency detecting processor 6 is provided.

FIGS. 15A-15C show an arrangement of the J0-byte management table used for the interface IF by the embodiment [2]. This embodiment is different from the table example of the embodiment [1] shown in FIGS. 3A and 3B in that 48-byte "Trace Strings" in the transmission field and the reception field respectively shown in FIGS. 15A and 15B are actually used and the 48-byte Trace String is preset as the receiving expected value by the destination node as shown in FIG. 15C.

Figure 16:
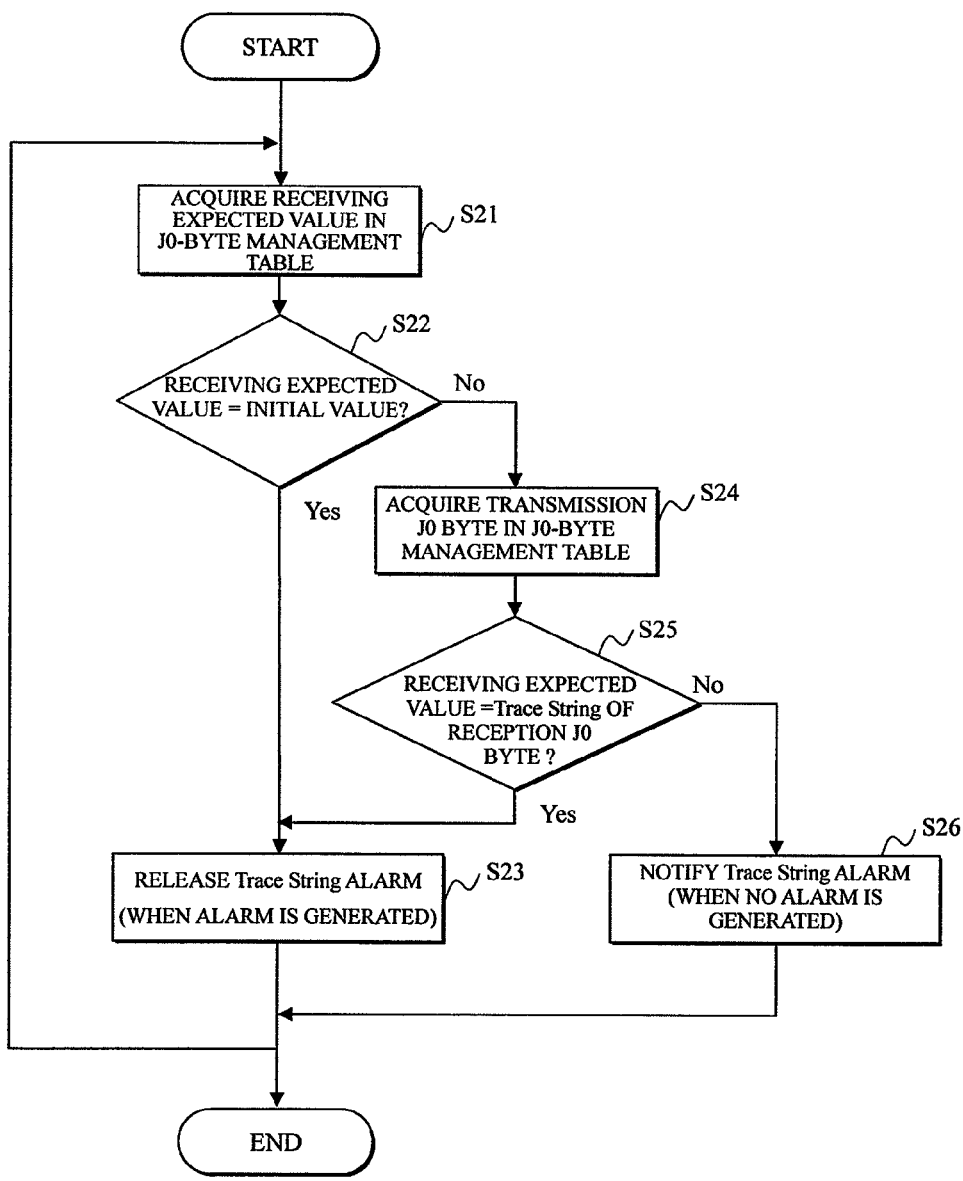
FIG. 16 is a flowchart showing an operation example of a J0-byte reception value/receiving expected value-inconsistency detecting processor used for each interface of a node in an embodiment [2] of the present invention.
Figure 17:
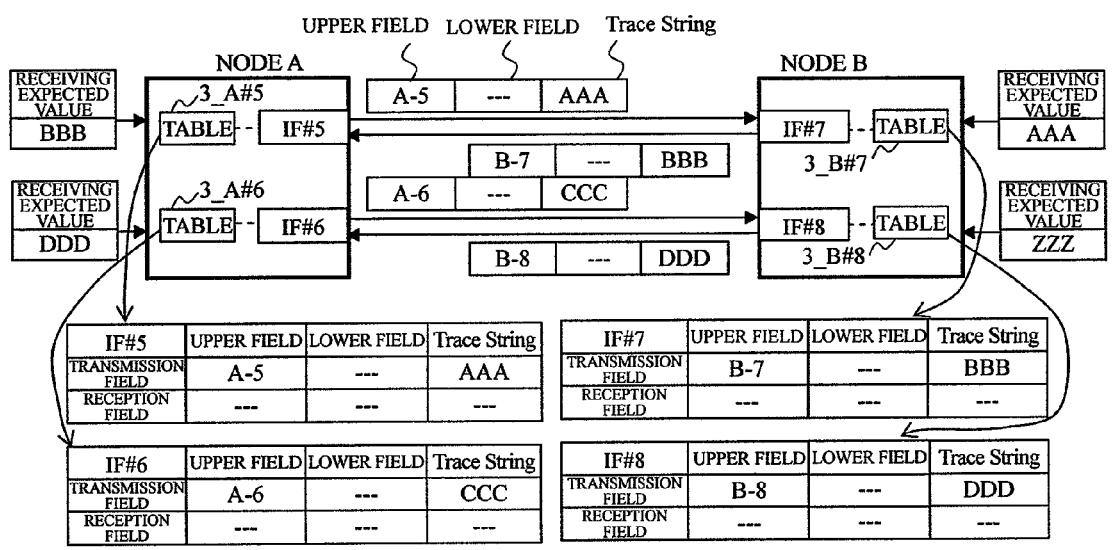
FIG. 17 is a block diagram showing an operation (1) in an embodiment [2] of the present invention.

FIG. 16 shows an operation flow of the inconsistency detecting processor 6. The operation of the inconsistency detecting processor 6 is mentioned in the correct connection operation example as follows:

Operation (1): FIG. 17

Since a connection between the interfaces is correctly performed in this operation, the same J0 byte as that in the normal connection operation (1) shown in FIG. 6 is transmitted/received between the nodes A and B. Additionally, "AAA" is stored in the Trace String of the J0 byte transmitted from the interface IF#5 of the node A. Similarly, "BBB" is stored in the Trace String of the J0 byte from the interface IF#7 of the node B to be transmitted, "CCC" is stored in the Trace String of the J0 byte from the interface IF#6 of the node A to be transmitted, and "DDD" is stored in the Trace String of the J0 byte from the interface IF#8 of the node B to be transmitted.

Figure 18:
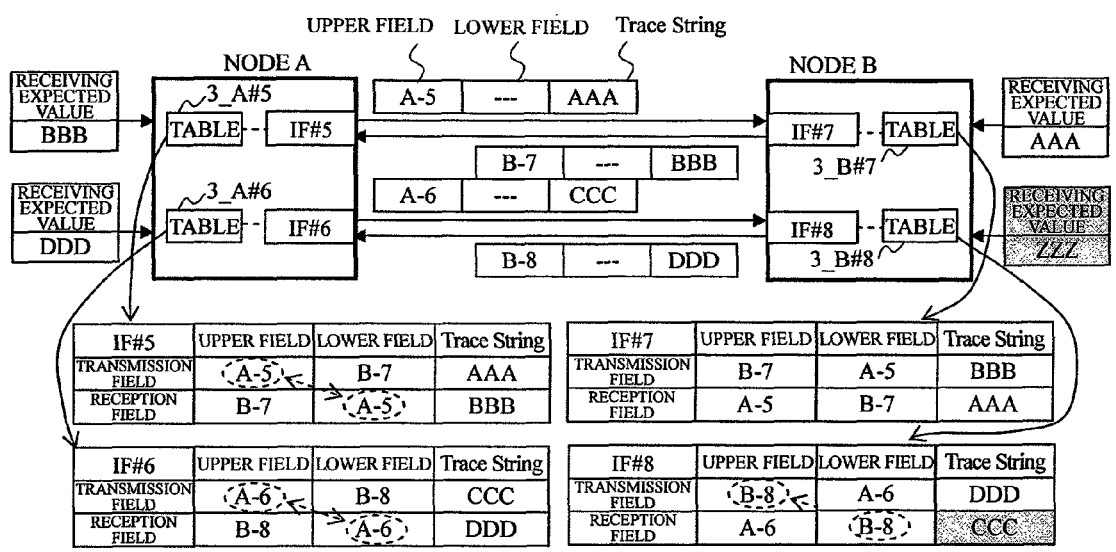
FIG. 18 is a block diagram showing an operation (2) in an embodiment [2] of the present invention.
Figure 19:
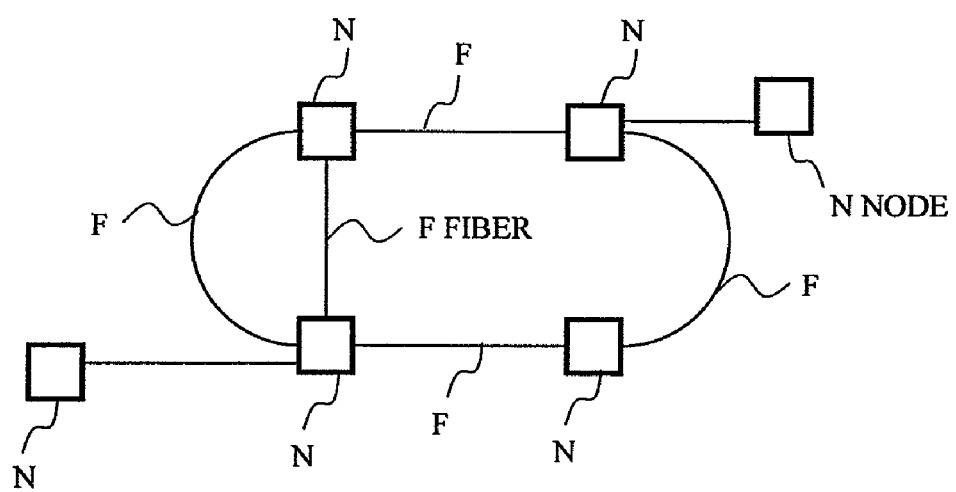
FIG. 19 is a block diagram showing a general network example constructed by a SONET device.
Figure 20:
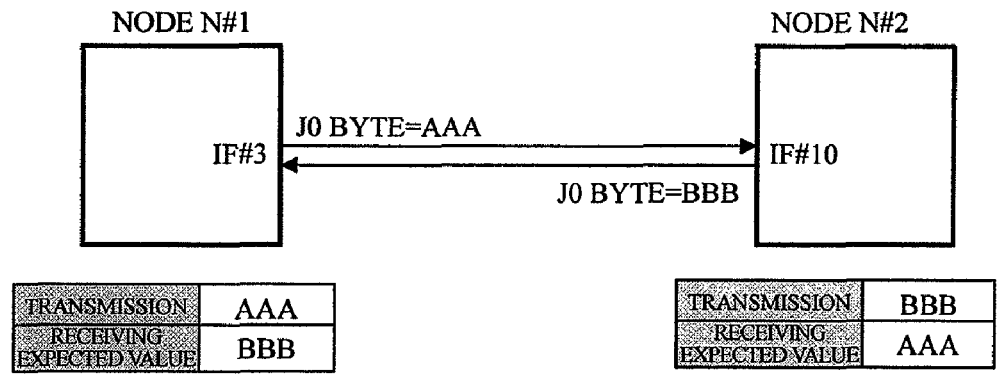
FIG. 20 is a block diagram for describing a correct connection operation in a prior art example.
Figure 21:
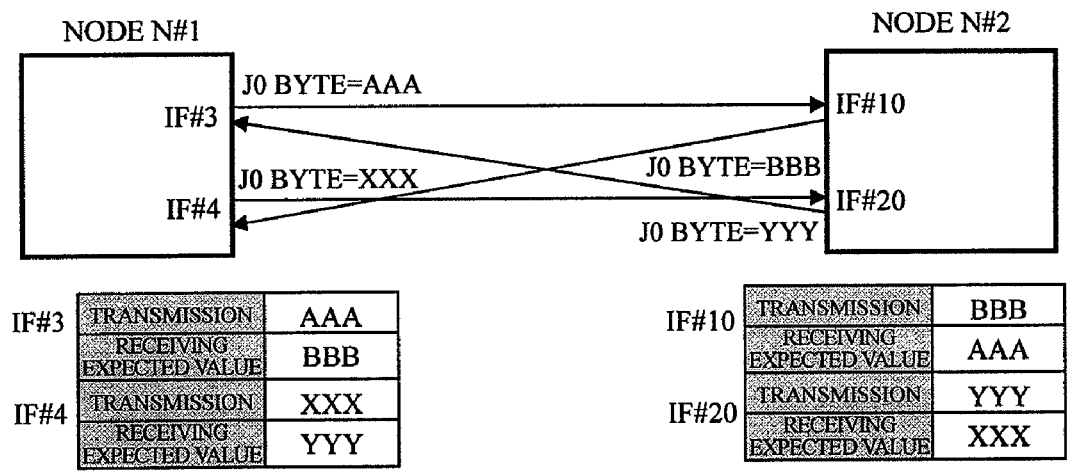
FIG. 21 is a block diagram for describing a misconnection operation in a prior art example.

Operation (2): FIG. 18

Since a correct connection is performed in this operation, the same table contents as that in the correct connection operation (4) shown in FIG. 9 can be obtained. Accordingly, it is recognized that no misconnection has occurred.

However, when a receiving expected value "ZZZ" of the J0 byte set by a user for the interface IF#8 is compared with the value "CCC" set in the Trace String of the J0 byte actually having received from the interface IF#8 in the node B (at step S25 of FIG. 16), both values are found different from each other. Therefore, a result of an existing connection verification becomes error (at step S26).

In this case, the misconnection is not detected as mentioned above and it is determined that the fiber connection between the nodes A and B is correct. Therefore, it becomes possible to determine that the cause of the fiber misconnection is user's missetting of the receiving expected value of the J0 byte set in the interface IF#8 of the node B. Accordingly, when the receiving expected value is not consistent with the reception value in this way, an alarm notification is performed (at step S26).

It is to be noted that the present invention is not limited by the above-mentioned embodiments, and it is obvious that various modifications may be made by one skilled in the art based on the recitation of the claims.

What is claimed is:

1. A fiber misconnection detecting method comprising:
   setting a node identifier of a source node and an interface identifier of an interface of the source node for inputting/outputting a signal in a predetermined first field of a first header, and transmitting the node identifier and the interface identifier of the source node set in the first field of the first header to a destination node;
   setting a node identifier of a destination node and an interface identifier of an interface of the destination node for inputting/outputting a signal in a predetermined first field of a second header, and transmitting the node identifier and the interface identifier of the destination node set in the first field of the second header to the source node;
   when the node identifier and the interface identifier set in the first field of the second header are received at the source node from the destination node, setting the node identifier and interface identifier copied from the first field of the second header in a predetermined second field of a third header, setting the node identifier and the interface identifier copied from the first field of the first header in a first field of the third header, and transmitting the third header to the destination node; and
   determining that a connection between the nodes is correct when the node identifier and the interface identifier set in the first field of the third header and the node identifier and the interface identifier set in the second field of the third header are received at the destination node and the node identifier and the interface identifier of the second field of the third header are consistent at the destination node with the node identifier and the interface identifier of the first field of the second header set at the setting of the first field of the second header and determining that the connection is not correct when the node identifier and the interface identifier of the second field of the third header are not consistent at the destination node with the node identifier and the interface identifier of the first field of the second header set at the setting of the first field of the second header.

2. The fiber misconnection detecting method as claimed in claim 1, wherein a J0 byte or a free space of a section overhead other than the J0 byte is used as the first and second fields.

3. The fiber misconnection detecting method as claimed in claim 1, wherein the determining includes generating an alarm in a form that indicates an interface and a misconnected destination when it is determined that the connection is incorrect.

4. The fiber misconnection detecting method as claimed in claim 1, further comprising setting an expected value in a third field of the first header at the source node before transmitting the first header to the destination node, setting the expected value in a third field of the third header at the source node before transmitting the third header to the destination node, and determining whether or not the expected value is consistent with a receiving expected value preset when the expected value set in the third field of the third header is received at the destination node.

5. The fiber misconnection detecting method as claimed in claim 4, further comprising determining that setting of the receiving expected value at the destination node is incorrect when the expected value is determined to be inconsistent with the receiving expected value preset when the expected value set in the third field of the third header is received at the destination node even if the connection is determined to be correct.

6. The fiber misconnection detecting method as claimed in claim 5, wherein a J0 byte or a free space of a section overhead other than the J0 byte is used as the first to third fields.

7. The fiber misconnection detecting method as claimed in claim 1, wherein the interface comprises a slot or a port.

8. A fiber misconnection detecting device comprising:
a first portion setting a node identifier of a source node and an identifier of an interface of the source node for inputting/outputting a signal in a predetermined first field of a first header and transmitting the node identifier and the interface identifier of the source node set in the first field of the first header to a destination node;
a second portion setting a node identifier of a destination node and an interface identifier of an interface of the destination node for inputting/outputting; a signal in a predetermined first field of a second header, and transmitting the node identifier and the interface identifier of the destination node set in the first field of the second header to the source node;
a third portion, when the node identifier and the interface identifier set in the first field of the second header are received at the source node from the destination node, setting the node identifier and the interface identifier copied from the first field of the second header in a predetermined second field of a third header, setting the node identifier and the interface identifier copied from the first field of the first header in a first field of the third header, and transmitting the third header to the destination node; and
a fourth portion determining that a connection between the nodes is correct when the node identifier and the interface identifier set in the first field of the third header and the node identifier and the interface identifier set in the second field of the third header are received at the destination node and the node identifier and the interface identifier of the second field of the third header are consistent at the destination node with the node identifier and the interface identifier of the first field of the second header set by the second portion and determining that the connection is not correct when the node identifier and the interface identifier of the second field of the third header are not consistent at the destination node with the node identifier and the interface identifier of the first field of the second header set by the second portion.

9. The fiber misconnection detecting device as claimed in claim 8, wherein a J0 byte or a free space of a section overhead other than the J0 byte is used as the first and second fields.

10. The fiber misconnection detecting device as claimed in claim 8, wherein the fourth portion includes a portion generating an alarm in a form that indicates an interface and a misconnected destination when it is determined that the connection is incorrect.

11. The fiber misconnection detecting device as claimed in claim 8, further comprising a fifth portion setting an expected value in a third field of the first header at the source node before transmitting the first header to the destination node, a sixth portion setting the expected value in a third field of the third header at the source node before transmitting the third header to the destination node, and a seventh portion determining whether or not the expected value is consistent with a receiving expected value preset when the expected value set in the third field of the third header is received at the destination node.

12. The fiber misconnection detecting device as claimed in claim 11, further comprising an eighth portion determining that setting of the receiving expected value at the destination node is incorrect when the seventh portion determines that the expected value is inconsistent with the receiving expected value preset when the expected value set in the third field of the third header is received at the destination node even if the fourth portion determines that the connection is correct.

13. The fiber misconnection detecting device as claimed in claim 12, wherein a J0 byte or a free space of a section overhead other than the J0 byte is used as the first to third fields.

14. The fiber misconnection detecting device as claimed in claim 8, wherein the interface comprises a slot or a port.

* * * * *